United States Patent Office 2,845,614
Patented July 29, 1958

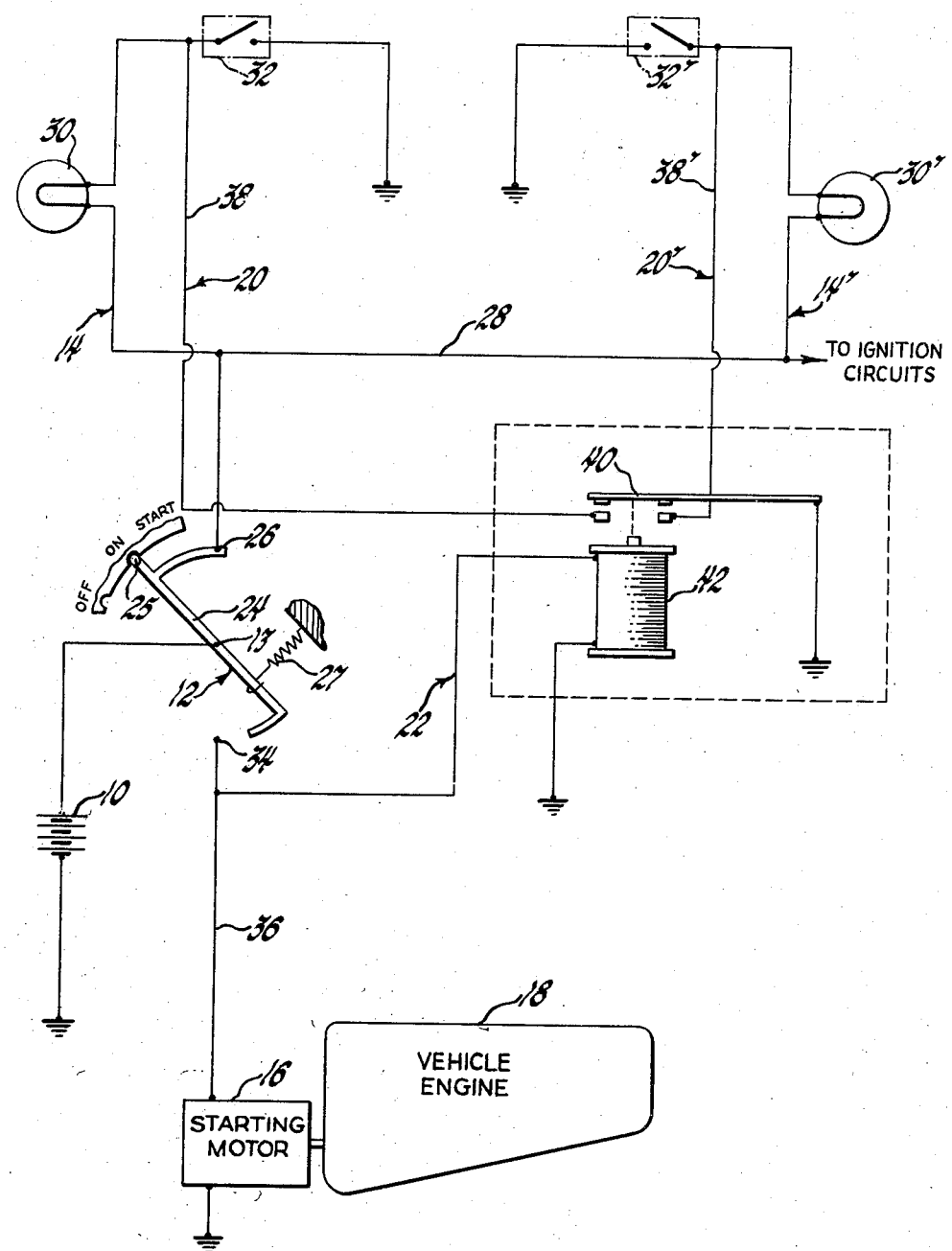

2,845,614

SIGNAL DEVICE TEST CIRCUIT

William E. Bell, Berkley, Mich., assignor to General Motors Corporation, Detroit, Mich., a corporation of Delaware Application September 19, 1956, Serial No. 610,860

3 Claims. (Cl. 340—213)

This invention relates to signal circuits of the type adapted to indicate the condition of associated apparatus and more particularly to means for testing the reliability of the signal circuit.

In many applications, signal circuits such as those including a tell-tale indicator are used to signify the existence of an abnormal value of the condition being monitored. For example, signal circuits of this type are commonly employed with vehicle engines to provide the operator with a warning signal upon the occurrence of excessive engine temperature. In this type of signal system, it is desirable to provide the operator with a periodic indication that the signal circuit is in operative condition so that he will be assured that the absence of a warning signal is not due to a malfunction of the signal circuit.

Accordingly, it is an object of this invention to provide an improved signal circuit including an automatically operated test circuit for indicating a malfunction of the signal circuit.

An additional object of this invention is to provide a signal circuit for monitoring a selected condition of an apparatus and which is adapted to signify reliability of the signal circuit as an incident to operation of the apparatus.

A further object of the invention is to provide a tell-tale signal system with a test circuit which is momentarily energized in response to the energization of the signal system.

In accordance with this invention there is provided a signal circuit for monitoring a selected condition of an apparatus and a test circuit associated therewith for indicating the reliability of the signal circuit as an incident to the operation of the apparatus. The test circuit is connected across the condition responsive element and includes switch means adapted to simultaneously energize the signal circuit and apparatus and to momentarily energize the test circuit.

A more complete understanding of this invention may be had from the detailed description which follows taken with the accompanying drawings in which the single figure of the drawings is a diagrammatic illustration of the inventive circuit and associated apparatus.

Referring now to the drawings there is shown an illustrative embodiment of the invention in a signal circuit of the tell-tale type which is adapted to monitor selected operating conditions of a vehicle engine. In general, the system comprises a voltage source or battery 10 and a manual ignition switch 12 which is adapted in first and second positions to energize the parallel connected signal circuits designated generally at 14 and 14'. The manual switch 12 in the second position is adapted to energize the starting motor 16 to initiate cranking of the vehicle engine 18 and to simultaneously energize the test circuits 20 and 20' through the intermediary of a relay circuit 22.

The system is energized through the ignition switch 12 from the battery 10, which is preferably the vehicle storage battery, having one terminal connected to a point of common reference potential or ground and the other terminal connected to the ignition switch 12. The ignition switch 12 is of the plural function type commonly employed on present-day automotive vehicles and has a movable contact 24 pivoted at 13 and adapted to assume the positions "off," "on," and "start" for coaction with the fixed contacts 26 and 34 as indicated in the drawings. The switch is preferably provided with a detent mechanism 25 for indexing in the "off" and "on" positions and a bias spring 27 to cause automatic return from the "start" position to the "on" position. With the switch 12 in the "on" position as indicated, the movable contact 24 engages the fixed contact 26. In this position the ignition circuit is completed for the vehicle engine and extends from the battery 10 through the switch 24 to the conductor 28 and thence to the ignition circuits as indicated by the legend.

The signal circuits 14 and 14' are adapted to monitor the engine temperature and the fuel level conditions, respectively, and to provide the vehicle operator with a tell-tale or warning signal upon the occurrence of abnormal conditions. With the switch in the "on" position, the signal circuits 14 and 14' are energized from the battery 10. The signal circuit 14 includes a signal device or lamp 30 responsive to current flow in the signal circuit to provide the operator with a warning or tell-tale signal. In series connection with the signal lamp 30 is a condition responsive element or switch 32 adapted to complete the signal circuit 14 to ground upon the occurrence of a predetermined value of the condition being monitored thereby. The condition responsive element or switch 32 in the illustrative embodiment suitably takes the form of a temperature responsive switch which is normally open and adapted to close at an excessive value of engine temperature. The signal circuit 14' is adapted to monitor fuel level and is connected in parallel with the signal circuit 14. It comprises a signal device or lamp 30' and a serially connected normally open fuel level switch 32' adapted to complete the signal circuit 14' to ground upon the occurrence of abnormally low fuel level. It will be appreciated that the signal devices or lamps 30 and 30' may be located on the instrument panel of the vehicle within view of the operator and that the condition responsive elements 32 and 32' are disposed appropriately in the vehicle to sense the variations being monitored.

The ignition switch 12 is adapted to simultaneously energize the vehicle engine starting circuit and the test circuits 20 and 20'. With the movable contact 24 in the "start" position it engages the fixed contact 34 while engagement with fixed contact 26 is maintained. A circuit is completed from the battery 10 through the movable contact 24 and fixed contact 34 through the conductor 36 to the starting motor 16 and thence to ground. Cranking of the vehicle engine 18 by the starting motor 16 requires only momentary energization of the starting motor and is effected in a well known manner.

During the engine starting interval with the ignition switch 24 in the "start" position, the test circuits 20 and 20' are energized. The test circuit 20 is connected in parallel with the condition responsive element or temperature switch 32 through the conductor 38 and relay actuable switch contacts 40 to ground. Similarly, the test circuit 20' is connected in parallel with the condition responsive element or pressure switch 32' through the conductor 38' and relay contacts 40 to ground. The relay circuit 22 extends from the fixed contact 34 of the ignition switch 24 through the relay coil 42 to ground and is energized from the battery 10 with the ignition switch in the "start" position.

In operation of the inventive circuit the operator is provided with a visual indication of the operative condition of the signal circuits as an incident to starting of the vehicle engine. To start the engine the ignition switch 24 is displaced from the "off" position in a clockwise direction to the "start" position causing engagement of the movable contact 24 with both fixed contacts 26 and 34. Thus the ignition circuits and the signal circuits 14 and 14' are simultaneously energized from the battery 10 through the fixed contact 26. Assuming that the engine temperature and fuel level conditions are normal, the temperature and pressure switches 32 and 32', respectively, will be open. The switch 24 in the "start" position will also energize the starting motor 16 from the battery through the movable contact 24. The "start" position of the switch 12 is maintained only momentarily until the engine starts and upon release of the switch by the operator it is returned to the "on" position under the influence of the bias spring.

However, during the momentary energization of the starting motor, the relay circuit 22 is energized to complete the test circuits 20 and 20'. With the relay circuit 22 energized the relay contacts 40 are closed and the test circuit 20 completes a shunt path around the condition responsive element 32 through the conductor 38 and relay contacts 40 to ground. Similarly, the test circuit 20' completes a shunt path around the condition responsive element 32' through the conductor 38' and relay contacts 40 to ground. Accordingly, an energizing circuit for the signal lamp 30 is completed during the starting interval of the engine through the test circuit 20. This circuit extends from the battery 10 through the ignition switch 12, signal lamp 30 to conductor 38 and thence through relay contacts 40 to ground. In a similar manner the energizing circuit for the signal lamp 30' is completed from the battery 10 through the ignition switch 12 to the signal lamp 30' and thence through conductor 38' and relay contacts 40 to ground. This momentary energization of the signal lamps 30 and 30' indicates to the operator that the signal circuits are in operative condition to reliably indicate engine operating conditions during operation of the vehicle.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

What is claimed is:

1. A circuit for indicating malfunction of a signal device, said circuit comprising a voltage source, a signal circuit connected across the voltage source and including a current responsive signal device and a condition responsive element for modifying the current flow in the signal circuit, a test circuit connected in parallel with said element, and a plural position switch having contacts connected in the signal circuit for energizing the signal circuit in first and second positions, and switching means in said test circuit operatively connected with said plural position switch and completing the test circuit when the switch is in said second position thereby energizing the signal device independently of the condition responsive element.

2. A circuit for indicating malfunction of a signal device of the type that is energized in response to an abnormal condition, said circuit comprising a voltage source, a signal circuit connected across the voltage source and including a current responsive signal device and a condition responsive element for modifying the current flow in the signal circuit, a test circuit connected in parallel with said element, and a manual switch having first and second operative positions and being spring biased to the first position, said switch having contacts connected in the signal circuit in both the first and second positions for energizing the signal circuit, and switching means in said test circuit operatively connected with said plural position switch and completing the test circuit when the switch is in said second position thereby energizing the signal device independently of the condition responsive element.

3. A circuit for indicating malfunction of a signal device of the type that is energized in response to an abnormal condition, said circuit comprising a voltage source, a signal circuit connected across the voltage source and including a current responsive signal device and a condition resposive element for modifying the current flow in the signal circuit, a test circuit connected in parallel with said element and including normally open relay actuable contacts, a manual switch having first and second operative positions, yieldable means urging said switch to return from the second position to the first position when displaced by an operator, said switch having contacts connected in the signal circuit and which are closed in the first and second positions for energizing the signal circuit, a relay circuit connected across said source and including a relay for closing said relay actuable contacts, said switch having contacts connected in said relay circuit and which are closed only when said switch is in the second position.

No references cited.